United States Patent [19]

Sproul

[11] 3,977,264
[45] Aug. 31, 1976

[54] METHOD OF MAKING POLY-V PULLEYS AND PRODUCT

[75] Inventor: Nolte V. Sproul, Canton, Ohio

[73] Assignee: Aspro, Incorporated, Westport, Conn.

[22] Filed: July 23, 1975

[21] Appl. No.: 598,340

[52] U.S. Cl. ............................... 74/230.8; 29/159 R
[51] Int. Cl.² .................. F16H 55/44; B21D 53/26
[58] Field of Search .............. 74/230.8; 29/159 R X

[56] References Cited
UNITED STATES PATENTS

| | | | |
|---|---|---|---|
| 2,929,345 | 3/1960 | Zatyko, Sr. | 74/230.8 X |
| 3,242,559 | 3/1966 | Olsen | 74/230.8 X |

*Primary Examiner*—Leonard H. Gerin
*Attorney, Agent, or Firm*—Frease & Bishop

[57] ABSTRACT

A one-piece cup-shaped metal poly-V pulley has an annular flange formed with a series of relatively narrow, deep, V-shaped grooves which have thickened groove valley walls adjacent the open end of the flange, and the annular flange terminates in an outturned radial stiffening flange. The series of poly-V pulley grooves is adapted to engage a Poly-V Belt in a Serpentine drive or conventional Poly-V drive train.

The poly-V pulley is made by forming a cup-shaped blank with a generally cylindrical annular flange which terminates at its open end in an outturned radial flange. A series of wide opening, shallow, corrugation-like V-shaped grooves then is cold rolled in the cylindrical flange by outwardly and inwardly displacing portions of the flange wall to form rounded groove valleys with intervening rounded crests, and slightly thinning the flange wall metal in the crests and valleys while presenting appreciable groove side wall thinning. The groove walls then are axially squeezed to compress the walls to sinuous shape while maintaining constant the radial dimensions of the inner and outer rounded surfaces of the grooves during axial squeezing. The sinuous formed flange wall then is roller worked, compressed and extruded to form sharp V-shaped outer groove crests and thickened metal in the groove valley walls.

12 Claims, 13 Drawing Figures

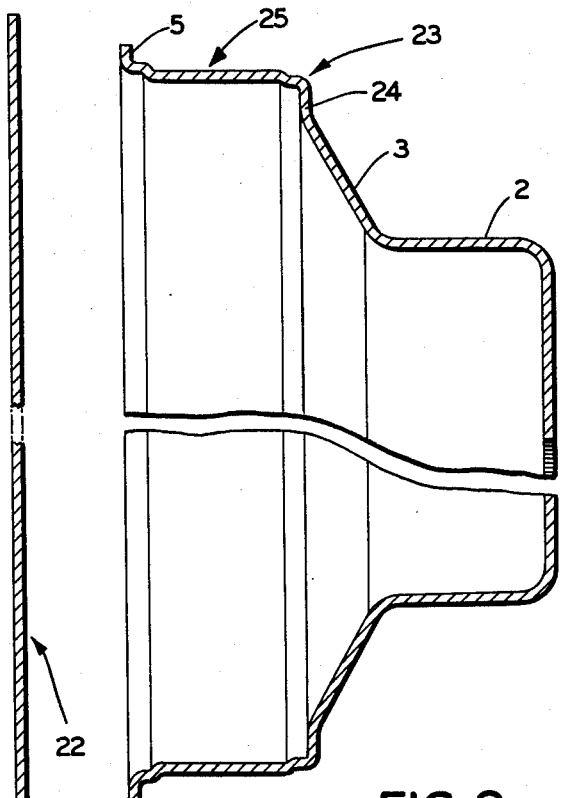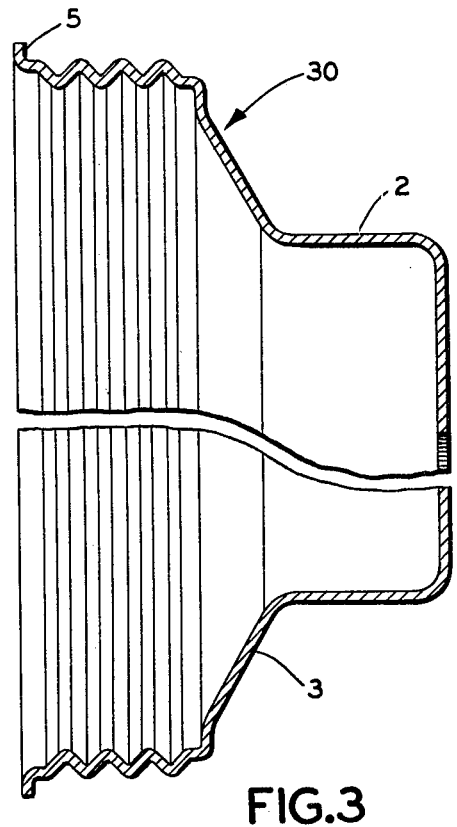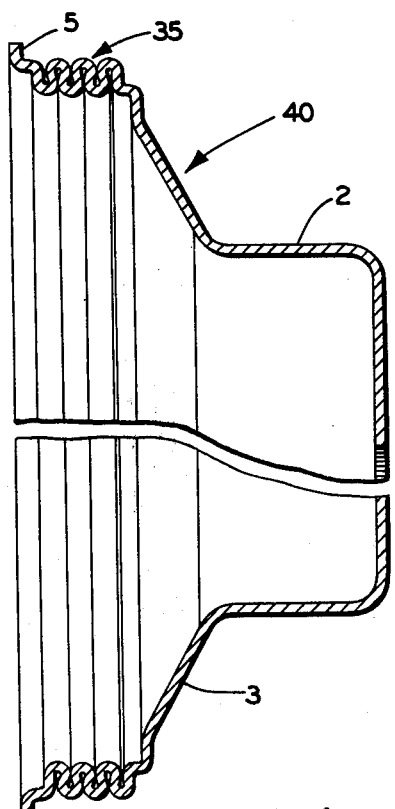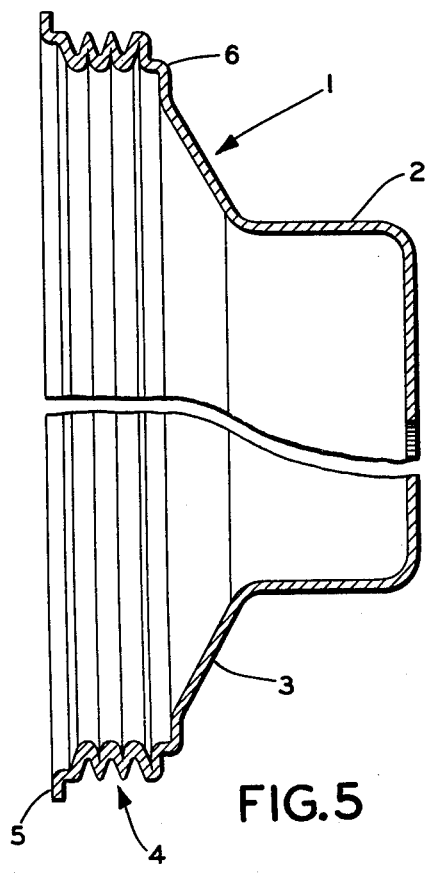
FIG.1   FIG.2   FIG.3   FIG.4   FIG.5

METHOD OF MAKING POLY-V PULLEYS AND PRODUCT

BACKGROUND OF THE INVENTION

Field of the Invention

The invention relates to a poly-V type of V-grooved sheet metal pulley for use in Poly-V Serpentine drive systems; and more particularly, to a new sheet metal poly-V pulley structure having roller spun cold-worked thickened groove-forming walls provided with a plurality of relatively narrow deep V-grooves formed in an axially extending pulley flange wall terminating in an outturned radial stiffening flange.

The invention relates further to a new combination of steps by which such a poly-V type V-grooved sheet metal pulley may be made to provide strong and thickened groove-forming walls in a one-piece cup-shaped sheet metal blank, and to provide an outturned radial stiffening flange at the open end of the cup for maintaining rigidity, stiffness, roundness, and parallelism of the poly-V grooved flange with the axis of the pulley when operating under heavily loaded drive conditions in a system containing a plurality of such pulleys as components.

Description of the Prior Art

The advent of Poly-V Serpentine drives which use a single poly-V belt to drive all of the under-the-hood-accessories in an automotive power unit, and which replaces a plurality of belts heretofore used to drive a fan, a water pump, an alternator, an air pump, power steering components, and air conditioning mechanisms, has called for strong, efficient and reliably operating poly-V pulley products.

Poly-V pulleys should have accurately formed V-grooves, dynamic pulley balance, and thick, rigid, strong and stable cold-worked metal in the poly-V groove pulley flange to provide the grooved flange with the necessary strength and rigidity for satisfactory and efficient operation of a poly-V drive system under heavy loading.

Prior poly-V pulleys, such as shown in U.S. Pat. No. 3,368,376, have had poly-V grooves formed with different angular contours on the inside and outside of the groove walls. Also, the metal in the groove walls has been formed by tension stretching and thinning which results in a weakened structure. In addition, the open end of the grooved pulley flange wall may not have sufficient rigidity and stiffness to prevent the pulley from becoming out of round under heavy loading, or to maintain parallelism between the grooved flange and the pulley axis during heavily loaded operation. This may result in inefficient driving contact between the pulley and the poly-V belt in a Poly-V Serpentine drive system.

Further, the manner in which the poly-V grooves are formed, as taught in said U.S. Pat. No. 3,368,376, produces groove-forming walls which are thinner than the parent metal in the pulley flange in which the grooves are formed; which are non-uniform in thickness because of a different inner and outer angular contour of the V-groove formations; and which inherently involve stretching the metal in the V-groove walls. These characteristics, which result from the manner in which the poly-V grooves are formed, all are undesirable. Thus, a new procedure for manufacturing poly-V pulleys which avoid the stated undesirable characteristics is a wanted concept.

Accordingly, there exists a need for a new poly-V pulley structure, and a method of making such a pulley, which provide increased strength and rigidity to the grooved pulley flange wall; thereby avoiding the inherent weaknesses present in prior poly-V pulleys, and avoiding the undesirable characteristics inherently present in prior pulleys resulting from the prior procedures used in the manufacture of such prior pulleys.

SUMMARY OF THE INVENTION

Objectives of the invention include providing a new one-piece sheet metal pulley structure of the poly-V type, having stiff and strong cold-worked V-groove-forming walls, thicker in the groove valleys than the thickness of the parent metal of the pulley flange wall in which the grooves are formed; providing such a pulley structure in which the grooved pulley flange wall terminates at its open end in an outturned radial stiffening flange which maintains pulley roundness and parallelism between the grooved pulley flange wall and the pulley axis under heavy pulley drive operating loading; providing a new method, new procedures, and a new series of steps for manufacturing such one-piece sheet metal poly-V grooved pulleys; and providing new pulley products and methods of making such pulleys which achieve the stated objectives effectively and efficiently, and which solve problems and satisfy needs existing in the poly-V belt drive art.

These and other objects and advantages may be obtained by the new pulley construction, the general nature of which may be stated as including a one-piece sheet metal poly-V pulley formed from a cup-shaped blank having a hub wall, and an annular flange wall connected with the hub wall, the flange wall having an open end opposite that end connected with the hub wall; a series of relatively narrow deep outwardly opening V-shaped grooves formed in the blank flange wall adjacent said open end; the formed flange wall metal being configured to define relatively sharp crests and thickened groove valley walls, with groove side wall portions connecting the thickened valley walls and crests; the metal in the groove crests, valleys and side wall portions of the formed blank flange wall being cold worked and displaced to the configured shape from uniform thickness blank flange wall parent metal, and having roller spun groove side wall surfaces; the thickened valley walls having rounded inner surfaces; the metal in the valley walls being thicker radially between the valleys and rounded surfaces than the thickness of the blank flange wall parent metal; the metal in the crests between adjacent grooves also being thicker radially than the thickness of the blank flange wall parent metal; and the formed flange wall terminating at its open end in an outturned radial stiffening flange.

The general nature of the new method of making the new pulley construction includes the steps of forming a cup-shaped blank with a generally cylindrical annular flange wall terminating at its open end in an outturned radial flange; then forming a series of wide-opening shallow corrugation-like V-shaped grooves in the blank flange wall by outwardly and inwardly displacing portions of the flange wall to form rounded groove valleys with intervening rounding crests; then axially squeezing the V-groove, formed walls to compress the walls to sinuous shape; and then roller spinning, working, compressing, and extruding the sinuous formed metal to form poly-V grooves therein with sharp V-shaped outer groove crests and thickened metal in the groove valley walls.

BRIEF DESCRIPTION OF THE DRAWINGS

A preferred embodiment of the poly-V pulley structure invention and of the new method of making such pulley — illustrative of the best mode in which applicant has contemplated applying the principles — are set forth in the following description and shown in the drawings and are particularly and distinctly pointed out and set forth in the appended claims.

FIG 1 is a somewhat diagrammatic sectional view, with parts broken away, of a sheet metal blank from which the new poly-V pulley structure may be formed;

FIG. 2 is a sectional view, with parts broken away, through a cup-shaped blank drawn from the sheet blank of FIG. 1, used as an initial stage blank in making the new pulley structure;

FIG. 3 is a view similar to FIG. 2 showing the next operation in the manufacture of the new pulley structure, during which a series of shallow rounded valley and crest grooves are formed in the annular flange of the pulley blank shown in FIG. 2;

FIG. 4 is a view similar to FIGS. 2 and 3 showing the next operation in the manufacture of the new poly-V pulley, in which the grooves in the stage blank of FIG. 3 are squeezed and compressed axially to sinuous shape;

FIG. 5 is a view similar to FIGS. 2, 3 and 4 showing the final stage in the manufacture of the improved poly-V pulley, during which the relatively deep and narrow grooves with thickened valley-forming walls and a terminal stiffening flange are formed in the stage blank of FIG. 4;

Similar numerals refer to similar parts throughout the various figures of the drawings.

DESCRIPTION OF THE PREFERRED EMBODIMENT

Poly-V Pulley Structure

Figure 6:
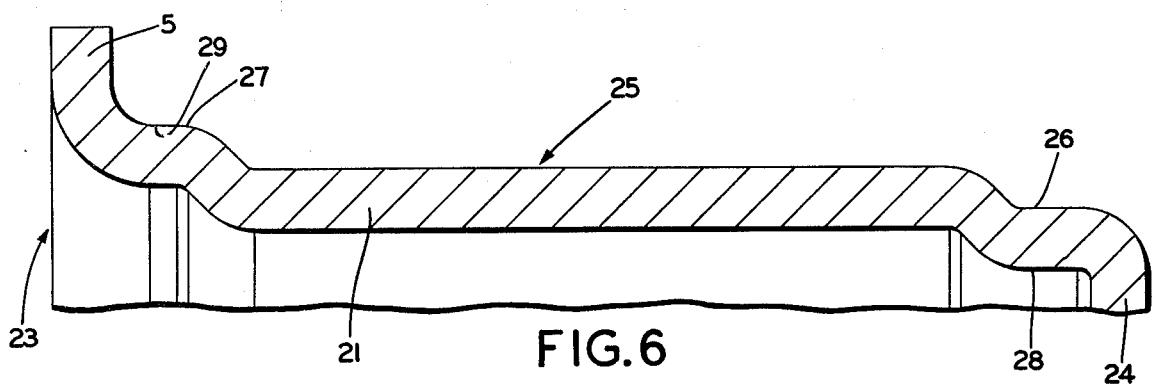
FIG. 6 is a greatly enlarged fragmentary sectional view of the annular flange formation of the cup-shaped stage blank of FIG. 2.
Figure 7:
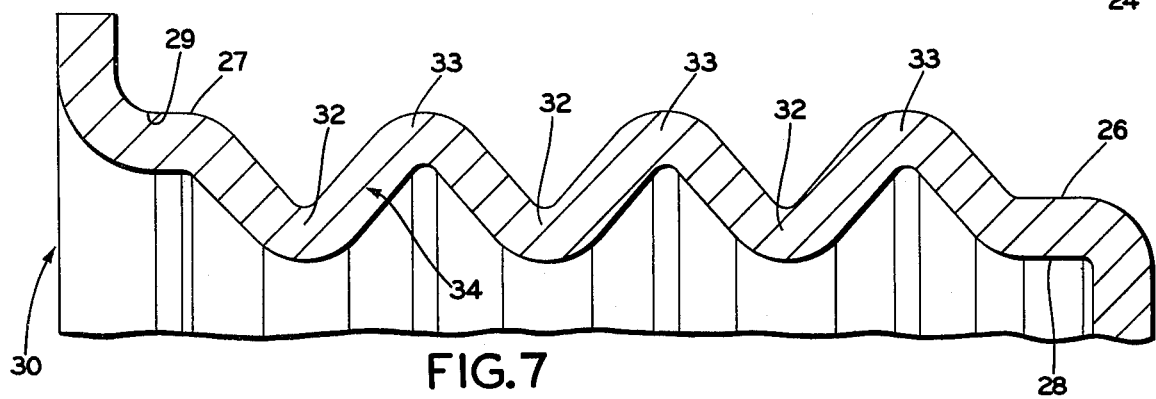
FIG. 7 is a view similar to and on the same scale as FIG. 6, of the shallow grooved flange wall in the stage blank of FIG. 3.
Figure 8:
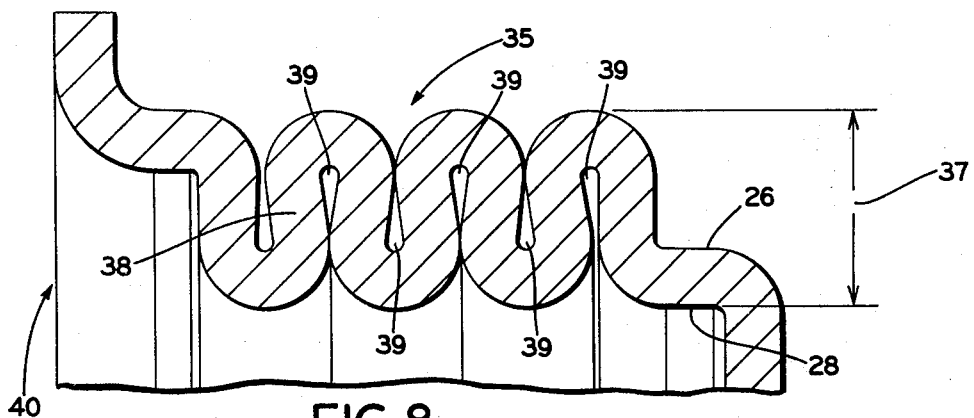
FIG. 8 is a view similar to FIGS. 6 and 7 showing the compressed and squeezed sinuous shape of the stage blank flange wall of FIG. 4.
Figure 9:
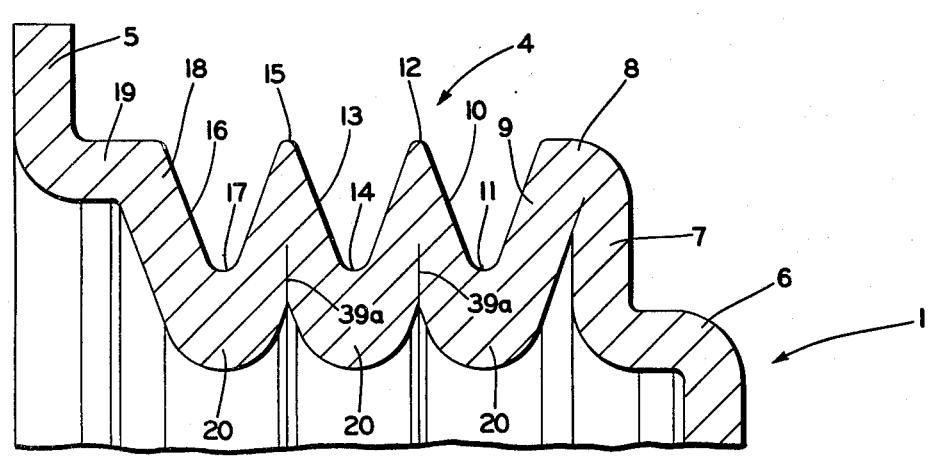
FIG. 9 is a view similar to FIGS. 6, 7 and 8 showing the contour of the cold-worked annular flange formed with poly-V grooves in the pulley of FIG. 5.

The new pulley structure concept of the invention is best shown in FIGS. 5 and 9. The interrelated new method of making the new poly-V pulley structure of the invention is shown somewhat diagrammatically by the stage blanks of FIGS. 1 to 4, enlarged portions of which are shown in FIGS. 6, 7 and 8. Typical apparatus in which the various steps of the improved method may be carried out are shown somewhat diagrammatically in FIGS. 10, 11, 12 and 13.

Pulleys embodying the invention may have any diameter specified to suit the requirements of the poly-V belt drive system in which the new poly-V pulleys are components. Accordingly, for ease of illustration, the pulley blanks and pulley shown in FIGS. 1 through 5 have parts broken away to indicate that the pulley or blanks may have any selected diameter.

Also, the pulley 1, as shown, has a secondary cup-shaped hub portion 2 which may be mounted in any desired manner in a poly-V pulley drive system. The hub portion 2 may be connected by a typical tapered wall 3 with the poly-V flange wall generally indicated at 4 in which the poly-V grooves are formed. The grooved flange wall 4 is located at the open end of the larger cup-shaped portion of the pulley 1, and the grooved flange wall 4 terminates in an outturned radial flange 5.

The improved poly-V pulley structure is not dependent upon the particular shape of the hub portion 2 or of the tapered wall 3, since any bell-shaped wall or disc wall may extend from the grooved flange wall 4 to provide hub means at the portion of the pulley flange 4 remote from the outturned radial stiffening flange 5, depending upon the mounting requirements for the pulley in the drive system in which it is a component.

The new structural characteristics of the grooved flange wall 4 of the poly-V pulley 1 are best shown in FIG. 9. The flange wall 4 may have an annular shouldered corner 6 connected to the tapered wall 3. The corner wall 6 then extends preferably radially outwardly at 7 to join the rounded corner 8 connected with the V-groove forming annular wall portion 9 for the V-shaped groove 10 having a valley 11 and a crest 12. Crest 12 also is a crest at one side of the groove 13 having a valley 14 and a crest 15 at its other side. The crest 15 also is a crest of the groove 16, having a valley 17. The outer wall 18 of the groove 16 extends upwardly and is connected with a circular wall portion 19 forming the outer open end portion of the pulley 1. The wall portion 19 terminates in the outturned radial stiffening flange 5, as shown.

The metal wall portions 20 which form the walls of valleys 11, 14 and 17 of the grooved pulley flange 4, each are substantially thicker, radially of the valleys, than the thickness of the parent metal, indicated at 21 in FIG. 6, in which the grooves 10, 13 and 16 are formed.

The V-shaped grooves 10, 13 and 16 each are relatively narrow and deep, as shown, and the crests 12 and 15 are quite sharp as compared with the rounded shape of the inner surface of the metal wall portions 20 forming the walls of the groove valleys 11, 14 and 17.

The special contour and increased metal thicknesses of portions 20 of the grooved flange wall 4 of the improved one-piece sheet metal poly-V pulley 1 shown and described, are important facets of the concept of the invention and result from the new procedures used in the manufacture described below of the new poly-V pulley. This special contour and the thickened portions of flange 4 combined with the stiffening flange 5 provide the new rigidity, stiffness, strength, roundness and maintained parallelism characteristics of the poly-V pulley structure of the invention which overcome prior art difficulties, while also presenting the accurate formation, dynamic balance, and cold worked metal characteristics of roller spun steel pulleys.

Method of Making Poly-V Pulleys

The special procedure for manufacturing pulleys 1, having the combination of new characteristics described, as illustrated in FIGS. 1 through 9. A sheet metal blank 22 (FIG. 1) of proper size is drawn by usual press operations in a series of cup drawing dies to form the cup-shaped blank, generally indicated at 23 in FIG. 2. The blank 23 includes the cup-shaped hub portion 2, as well as the tapered wall portion 3, previously described. A preferably annular radially extending wall zone 24 extends from the tapered wall 3 and is connected to a specially contoured flange wall 25. The contoured wall 25 terminates at its open end in the outturned radial stiffening flange 5.

The contoured flange 25 has an offset 26 at one end and another offset 27 at the other end, and the intervening preferably cylindrical portion 21 connects the offsets 26 and 27 and provides the parent metal in which the poly-V grooves 10, 13 and 16 ultimately are formed. The cylindrical flange portion 21 (FIG. 6) preferably is located midway radially between the inner cylindrical surface 28 of offset 26 and the outer cylindrical surface 29 of offset 27.

The cup-shaped stage blank 23 of FIGS. 2 and 6 in the next step of manufacture of the pulley 1 has a series of wide-opening, shallow, corrugation-like, rounded, V-shaped grooves cold rolled in the intervening cylindrical flange portion 21 to form the rounded groove stage blank 30 of FIGS. 3 and 7. This groove cold rolling operation may be carried out in roller spinning dies 31, shown in FIG. 10, described below.

In cold rolling grooves in the intervening cylindrical flange portion 21 of stage blank 23 to form the grooved stage blank 30 of FIGS. 3 and 7, the metal in flange portion 21 (FIG. 6) is displaced outwardly and inwardly of its location at 21 in FIG. 6 to form the rounded groove valleys 32 with intervening rounded crests 33, as best shown in FIG. 7.

The inner rounded surfaces of the valleys 32 preferably have the same minimum diameters as the diameter of the inner cylindrical surface 28 of the offset 26. Similarly, the maximum outer surface diameters of the rounded crests 33 have the same diameter as the outer surface diameter 29 of the offset 27.

This contoured interrelationship between the metal formation of the contoured flange wall 25 of FIG. 6, and the shallow rounded grooves shown in FIG. 7, provides minimum stretching of the parent metal in the intervening cylindrical flange portion 21 of the cup-shaped blank 23. This minimum stretching results in only a slight thinning of the metal in the rounded valley and crest portions 32 and 33 and such stretching and resultant thinning is maintained at a minimum because of the simultaneous outward and inward displacement of the metal in forming the V-grooves from the location of the flange portion 21 midway radially between the offsets 26 and 27.

However, even though the metal is slightly thinned at the valleys and crests 32 and 33, the groove-forming walls connecting the valleys and crests, such as indicated at 34, retain a metal thickness not appreciably thinner than the thickness of the parent metal in the cylindrical flange portion 21 of the cup-shaped stage blank 23 of FIG. 6.

The next step in the manufacture of the pulley 1 is illustrated in FIGS. 4 and 8. The rounded V-shaped groove walls forming the valleys 32 and crests 33 in the stage blank 30 of FIGS. 3 and 7, are axially squeezed and compressed to form the sinuous shape indicated at 35 in FIGS. 4 and 8. This squeezing and compressing may be carried out in squeeze dies of a press generally indicated at 36 in FIG. 12, described below.

During the operation of squeezing the groove-forming walls 34 of FIG. 7 to the sinuous shape of FIG. 8, the diameter or radial dimension of the inner rounded surfaces of the groove valleys 32 of FIG. 7, which corresponds to the diameter of the inner cylindrical surface 28 of offset 26, is maintained constant.

Thus, the dimension represented at 37 in FIG. 8 of the sinuous shape between the inner and outer crests of the V-grooves in FIG. 7 increases in FIG. 8 over that of FIG. 7, as the groove walls 34 are collapsed toward each other to the position indicated at 38 in FIG. 8. During this squeezing and collapsing operation, the metal in the valleys 32 and crests 33 (FIG. 7) which may have been thinned slightly as described above during the groove-forming operation of the stage blank 30 of FIG. 7, may thicken somewhat as the metal is displaced in forming the sinuous shape 35 of FIG. 8.

Except for the small voids indicated at 39 in FIG. 8 between the various folds of collapsed walls 38, the metal in the sinuous flange shape 35 of the squeezed stage blank 40 if FIG. 8 has more than twice the radial thickness, represented by the dimension 37 than the thickness of the parent metal 21 in the cup-shaped blank 23 of FIG. 6. The length of the sinuous shape 35 is substantially reduced from the length of the intervening wall 21 in FIG. 6. This provides a relocated and thicker metal zone in the stage blank 40 in which the poly-V grooves are to be formed.

The final poly groove-forming operation is illustrated in FIGS. 5 and 9 during which the metal in the sinuous shape 35 of FIG. 8 is roller worked, compressed, displaced and extruded in various zones to form the sharp V-shaped pulley grooves 10, 13 and 16, defined by the V-shaped crests 12 and 15 and the valleys 11, 14 and 17 having the thick rounded valley walls 20. This roller working poly-V groove-forming operation may be carried out in the roller spinning dies generally indicated at 41 in FIG. 13, described below.

During the poly-V groove-forming operation resulting in the finished V-groove structure shown in FIG. 9, the diameter or radial dimension of the inner rounded surfaces of the thick valley walls 20 which corresponds to the diameter of the inner cylindrical surface 28 of offset 26 (FIGS. 6, 7 and 8) again is maintained constant. However, the metal in the sinuous shape 35 of FIG. 8 is displaced from portions of the collapsed walls 38, laterally, inwardly and outwardly to form the thickened rounded valley walls 20, the sharp crests 12 and 15, and the relatively narrow and deep poly-V grooves 10, 13 and 16. In particular, the metal forming the sharp crests 12 and 15 is metal that has been displaced or extruded from rounded portions of the sinuous shape 35 of FIG. 8. During the metal displacement, the voids 39 of FIG. 8 that open inwardly are filled so that the voids are eliminated as indicated at 39a in FIG. 9.

In the finished poly-V pulley 1 of FIG. 9, the offset 26 of FIGS. 6, 7 and 8 becomes the annular shouldered corner 6 of pulley 1 (FIG. 9). Further, the offset 27 of FIGS. 6 and 7 which is displaced somewhat outwardly in forming the stage blank 40 of FIG. 8, is further displaced or enlarged circumferentially to form the circular wall portion 19 of FIG. 9 with its outer circumferential surface aligned with the groove crests 12 and 15.

Thus, the procedure described for the manufacture of the poly-V pulley 1 with the grooved flange 4, best shown in FIG. 9, provides the described special contour and the thickened portions of the flange wall 4 which impart the stated rigidity, stiffness, strength, roundness and maintained parallelism characteristics of a pulley 1 having the improved poly-V grooved flange wall 4.

Equipment For Spinning and Squeezing Operations

Figure 11:
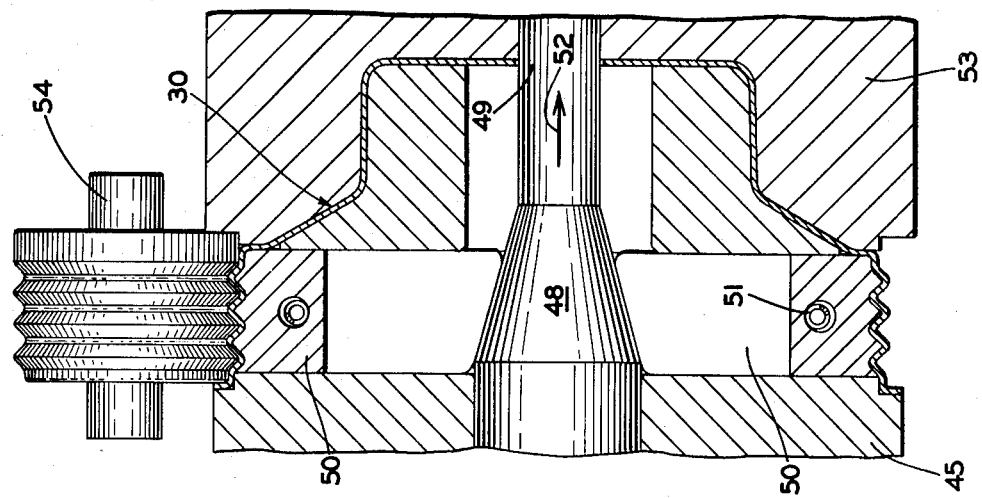
FIG. 11 is a fragmentary view similar to a portion of FIG. 10, illustrating the position of the parts after the shallow groove spinning operation has been completed to form the stage blank of FIG. 3.
Figure 10:
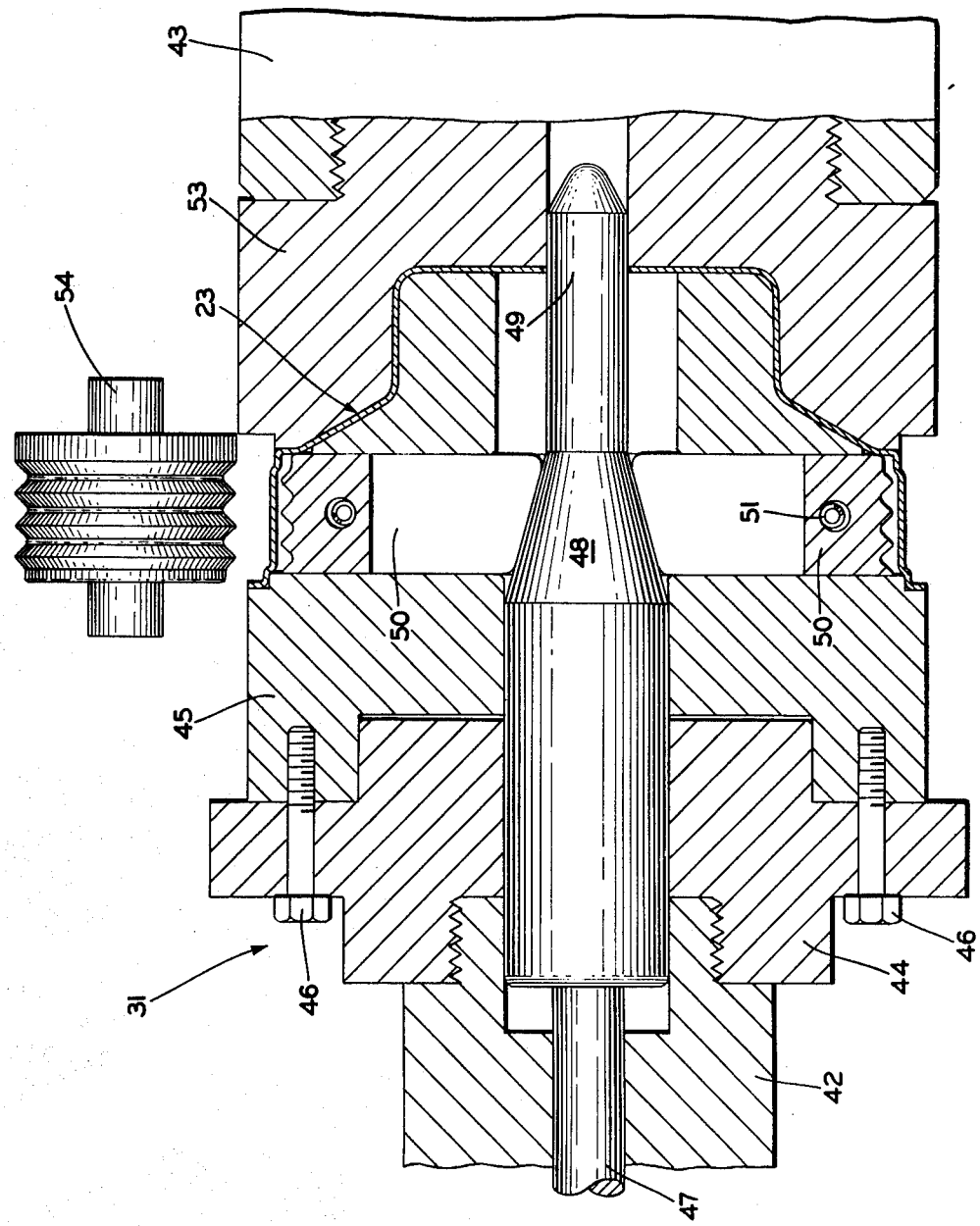
FIG. 10 is a fragmentary somewhat diagrammatic sectional view illustrating equipment that may be used for an initial roller spinning of the shallow V-grooves in the cup-shaped blank of FIG. 2, after the blank has been loaded on headstock and tailstock spin die forms, but prior to spinning.

FIGS. 10 and 11 illustrate typical spinning equipment having special dies that may be used to form the stage blank 30 of FIG. 3 from the cup-shaped stage blank 23 of FIG. 2. Typical lathe-type spinners are described and illustrated in U.S. Pat. Nos. 2,869,223, 2,892,431 and 3,852,863. The headstock spindle of such a spinner is indicated at 42 in FIG. 10, and the tailstock spindle at 43. A headstock tool mounting adapter member 44 may be mounted on headstock spindle 42, and the headstock die 45 bolted at 46 to adapter 44. The headstock mandrel operating shaft is indicated at 47 having a tapered segment actuating portion 48 and a mandrel nose 49.

Expanding die segments 50 are mounted for radial movement in die member 45 and are held normally in the retracted position shown by annular spring means 51. The segments are moved from retracted position of FIG. 10 to the expanded position of FIG. 11 by engagement with the tapered mandrel portion 48 as the mandrel is moved in the direction of the arrow 52 to the position shown in FIG. 11. A tailstock die 53 is mounted on tailstock spindle 43, and a V-grooved spinning roll 54 is mounted adjacent the headstock and tailstock dies 45 and 53 for movement toward and away from the spinner axis.

In operation, the roller spinning dies 31 of FIG. 10 are separated, and the cup-shaped blank 23 is mounted on the headstock die 45, being centered and guided by the mandrel nose 49. The tailstock die 53 is moved axially toward the headstock die clamping the stage blank 23 between the telescoped portions of the dies 45 and 53, as shown in FIG. 10. The dies 45 and 53 and blank 23 clamped between them then are rotated, and the spinning roll 54 is moved toward the dies to the position shown in FIG. 11. At the same time, during the progress of spinning, the expansible segments 50 are expanded to the position of FIG. 11 by mandrel movement in the direction of the arrow 52.

In this manner, the shallow rounded V-grooves are formed in the cup-shaped blank 23 to form the stage blank 30 of FIG. 3, also illustrated in FIG. 11.

Figure 12:
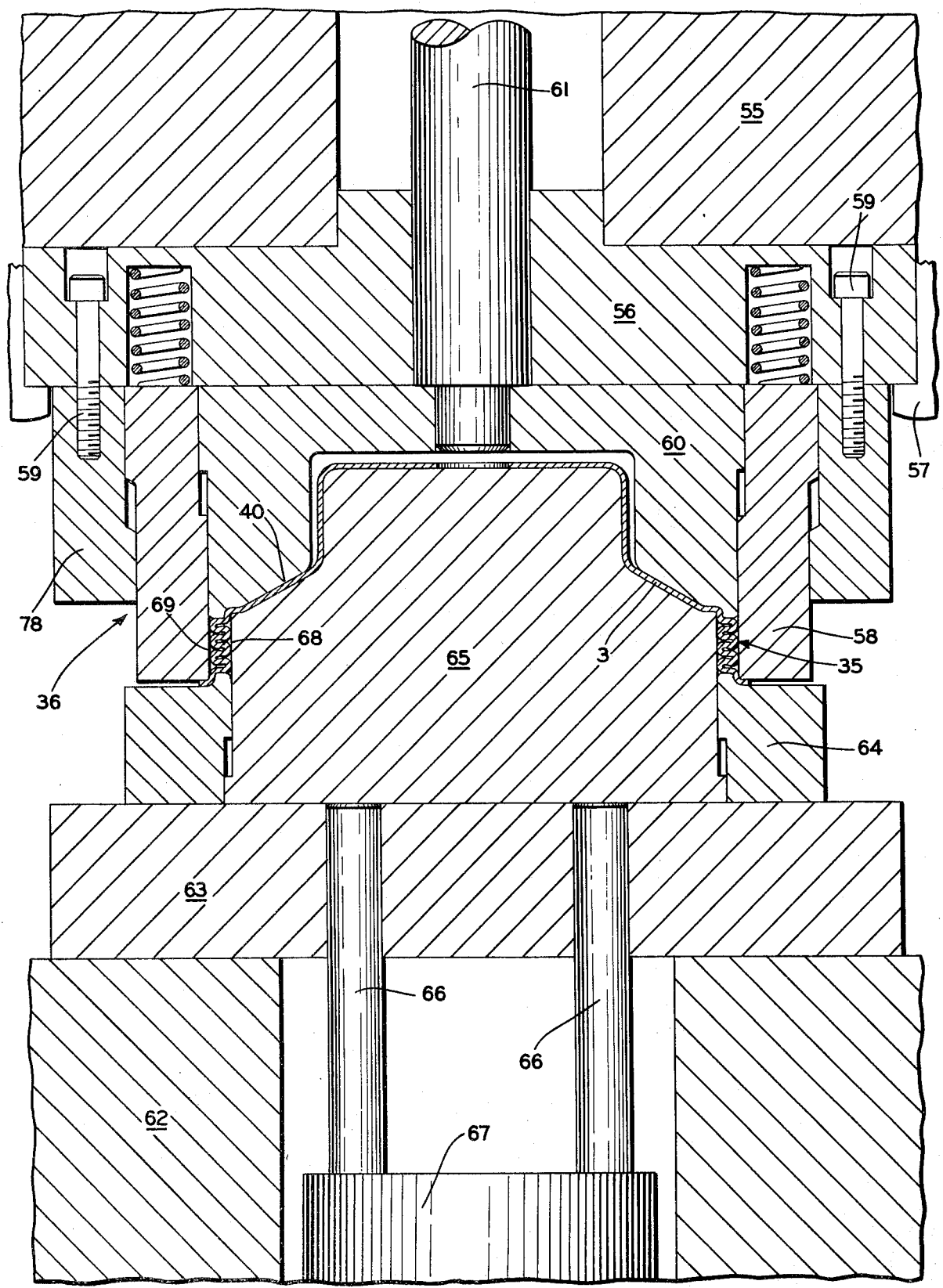
FIG. 12 is a somewhat diagrammatic sectional view through a press and dies used to squeeze the stage blank of FIG. 3 to form the squeezed blank of FIG. 4, illustrating the parts at the conclusion of the squeezing operation but before the stage blank has been stripped from the dies.

The squeezing of the grooves of stage blank 30 to the sinuous shape 35 of stage blank 40, illustrated in FIG. 4, may be carried out in the press, somewhat diagrammatically illustrated in FIG. 12, having a ram 55 to which a punch holder 56 may be clamped at 57. An upper die ring 58 floats under pressure and is contained by outer ring 78, which is bolted at 59 to the punch holder 56, and a punch die and knock-out 60 is mounted on knock-out shaft 61 for relative movement within die ring 58. The upper die 60 with die ring 58 form the punch die cavity.

The press bed 62 has a die shoe 63 mounted thereon supporting the lower die ring 64 and the lower die 65. The lower die 65 is mounted on piston rods 66 extending up from an air cylinder 67, so that the lower die 65 is movable axially with respect to the lower die ring 64 and is normally in raised position when the press is open.

In carrying out the squeezing operation, a stage blank 30 in which V-grooves have been rolled is placed on raised lower die 65, and the ram 55 moves downward, closing upper die ring 58 and punch die 60 over the blank 30 and clamping the tapered wall 3 between punch die 60 and lower die 65. As the ram continues to move downward, the pressure of air cylinder 67 is overcome and lower die 65 moves to the closed position shown in FIG. 12, squeezing the groove-forming walls 34 of the stage blank 30 to the sinuous shape 35, shown in FIG. 12.

The radial spacing between the outer circumferential surface 68 of lower die 65 and the inner circumferential surface 69 of the upper die ring 58 provides a confined space in which the dimension 37 is established of the sinuous shape 35 produced by the squeeze dies 36.

The press is opened and the ram 55 is raised. At this time, the knock-out shaft 61 is actuated to move downward so that punch knock-out 60 ejects the squeezed stage blank 40 from the dies.

A final poly-V groove roller spinning operation may be carried out on equipment shown in FIG. 13 wherein portions of a typical spinner are shown, similar to the spinner described in connection with FIGS. 10 and 11. The spinning dies 41 may include a headstock die 70 mounted on an adapter 71, in turn mounted on the headstock spindle 72 through which a mandrel 73 extends. The tailstock die 74 is mounted on the tailstock spindle 75, and a poly-V groove spinning roll 76 is mounted adjacent the headstock and tailstock dies 70 and 74 for movement toward and away from the spinner axis.

In operation, the spinning dies 70 and 74 are separated, and a squeezed blank 40 is mounted on headstock die 70, being centered and guided by the mandrel 73 acting as a pilot pin. The tailstock die 74 is moved axially toward the headstock die clamping the stage blank 40 between the telescoped portions of the dies 70 and 74, as shown in FIG. 13. Then, dies 70 and 74 and blank 40 clamped between them are rotated, and the spinning roll 76 is moved toward dies to the position shown in FIG. 13. During the spinning operation, the described metal displacement occurs, producing the described contour, form and displaced metal shown in FIG. 9 in the grooved flange wall 4 and completing the manufacture of the pulley 1.

Figure 13:
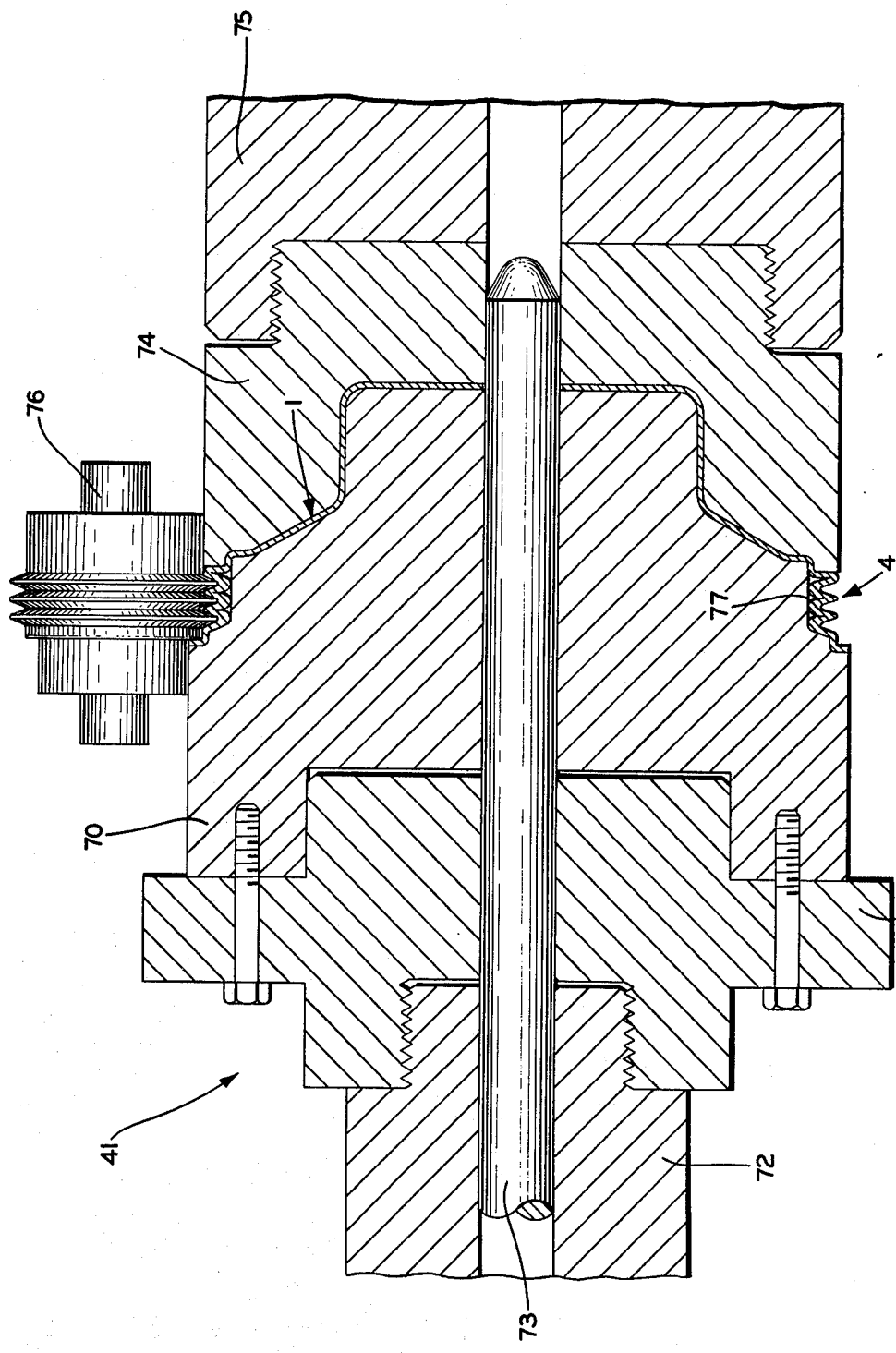
FIG. 13 is a somewhat diagrammatic view similar to FIG. 10, illustrating the spin die forms used to complete spinning and cold working of the squeezed blank of FIG. 4 to produce the finished pulley of FIG. 5, showing the parts at the completion of the spinning operation.

During the spinning of the poly-V grooves on the equipment shown in FIG. 13, the diameters of the inner surface of the rounded valley walls 20 of the grooved flange 4 are maintained by the cylindrical die surface 77 of headstock die 70, to have the same diameter as that of the inner cylindrical surface 28, as described.

IN GENERAL

The new one-piece cup-shaped spun metal poly-V pulley structure described, and the particular coordinated and interrelated procedure of making the pulley with the special contoured grooved flange wall with thickened metal portions and the outturned stiffening flange, provide a pulley and methods of making the pulley which may be manufactured and used easily and inexpensively with simple dies and produce products and utilize procedures which achieve the stated objectives, eliminate difficulties and pulley weaknesses heretofore existing in the art and solve problems and obtain the new results indicated.

In the foregoing description, certain terms have been used for brevity, clearness and understanding; but no unnecessary limitations are to be implied beyond the requirements of the prior art, because such terms are used for descriptive purposes and are intended to be broadly construed.

Moreover, the description and illustration of the new pulley structure and of the method of making the same are by way of example, and the scope of the invention is not limited to the exact details shown or described.

Having now described the features, discoveries, and principles of the invention, the particular new combination of structural features of the new poly-V pulley, the related procedural steps by which the improved pulley may be made, and the advantageous, new and useful results obtained; the new and useful structures, devices, elements, arrangements, procedures, methods and steps in the manufacture of the pulleys are set forth in the appended claims.

I claim:

1. A one-piece, sheet metal poly-V pulley formed from a cup-shaped blank having a hub wall, and an annular flange wall connected with the hub wall, the flange wall having an open end opposite that end connected with the hub wall; a series of relatively narrow, deep, outwardly opening V-shaped grooves formed in the blank flange wall adjacent said open end; the formed flange wall metal being configured to define relatively sharp crests and thickened groove valley walls, with groove side wall portions connecting the thickened valley walls and crests; and the metal in the groove crests, valleys and side wall portions of the formed flange wall being cold-worked and displaced to the configured shape from uniform thickness blank flange wall parent metal, and having roller spun groove side wall surfaces.

2. The pulley defined in claim 1 in which the formed flange wall terminates at its open end in an outturned radial stiffening flange.

3. The pulley defined in claim 1 in which the thickened valley walls have rounded inner surfaces, and in which the metal in the valley walls is thicker radially between the valleys and rounded surface than the thickness of the blank flange wall parent metal.

4. The pulley defined in claim 3 in which the metal in the crests between adjacent grooves is thicker radially than the thickness of the blank flange wall parent metal.

5. The method of making a poly-V pulley including the steps of forming a cup-shaped blank with a generally cylindrical flange wall terminating at its open end in an outturned radial stiffening flange; then forming a series of wide-opening, shallow, corrugation-like V-shaped grooves in the blank flange wall by outwardly and inwardly displacing portions of the flange wall to form rounded groove valleys with intervening rounded crests; then axially squeezing and compressing the V-groove formed walls to sinuous shape; and then roller spinning, working, compressing and extruding the sinuous-formed metal to form poly-V grooves therein with sharp V-shaped outer groove crests and thickened metal in the groove valley walls.

6. The method set forth in claim 5 in which during the step of forming the cup-shaped blank with a generally cylindrical flange wall, the blank is formed with a contoured flange having an outward offset connected with the outturned radial stiffening flange at one end and is formed with an inward offset at the other contoured flange end connected with the cup bottom wall.

7. The method set forth in claim 6 in which during the formation of the contoured flange which provides parent metal wherein poly-V grooves ultimately are formed, the cylindrical parent metal contoured flange is located radially midway between the inner cylindrical surface of the inward offset and the outer cylindrical surface of the outward offset.

8. The method set forth in claim 7 in which during the step of forming a series of wide-opening shallow corrugation-like V-shaped grooves, metal in the cylindrical parent metal contoured flange is displaced outwardly and inwardly of its location in the previously formed cup-shaped blank.

9. The method set forth in claim 8 in which rounded groove valleys and intervening rounded crests are formed as a part of the shallow V-shaped grooves.

10. The method set forth in claim 9 in which during the step of axially squeezing the groove formed walls to sinuous shape, the radial dimensions of the inner and outer rounded surfaces of the groove valleys and crests are maintained constant.

11. The method set forth in claim 10 in which the metal previously thinned during the shallow groove-forming operation is thickened during the axial squeezing operation.

12. The method set forth in claim 11 in which metal is displaced in the sinuous shape laterally, inwardly and outwardly to form the thickened metal in the groove valley walls during the poly-V groove-forming roller spinning operation.

* * * * *

UNITED STATES PATENT AND TRADEMARK OFFICE
CERTIFICATE OF CORRECTION

PATENT NO. : 3,977,264
DATED : August 31, 1976
INVENTOR(S) : Nolte V. Sproul

It is certified that error appears in the above-identified patent and that said Letters Patent are hereby corrected as shown below:

Column 2, line 64, change "rounding" to -- rounded --

Signed and Sealed this

Thirtieth Day of November 1976

[SEAL]

Attest:

RUTH C. MASON
Attesting Officer

C. MARSHALL DANN
Commissioner of Patents and Trademarks